(12) United States Patent
Fenu et al.

(10) Patent No.: US 9,540,090 B2
(45) Date of Patent: Jan. 10, 2017

(54) SUPPORT FOR DIVER PROPULSION VEHICLES

(71) Applicant: Suex S.R.L., Villorba (IT)

(72) Inventors: Alessandro Fenu, Villorba (IT); Marco Segatto, Treviso (IT); Arne Sieber, Zell am See (AT)

(73) Assignee: Suex S.R.L., Villorba, Treviso (IT)

( * ) Notice: Subject to any disclaimer, the term of this patent is extended or adjusted under 35 U.S.C. 154(b) by 0 days.

(21) Appl. No.: 14/719,195

(22) Filed: May 21, 2015

(65) Prior Publication Data

US 2015/0336636 A1 Nov. 26, 2015

(30) Foreign Application Priority Data

May 21, 2014 (IT) .............................. TO2014A0406

(51) Int. Cl.

| *B63C 11/46* | (2006.01) |
|---|---|
| *B63H 23/24* | (2006.01) |
| *B63B 17/00* | (2006.01) |
| *B63B 35/73* | (2006.01) |
| *B63H 25/02* | (2006.01) |
| *H04B 1/3822* | (2015.01) |
| *H04B 10/80* | (2013.01) |
| *B63C 11/26* | (2006.01) |
| *B63C 11/02* | (2006.01) |

(52) U.S. Cl.
CPC ............... *B63H 23/24* (2013.01); *B63B 17/00* (2013.01); *B63B 35/73* (2013.01); *B63C 11/26* (2013.01); *B63C 11/46* (2013.01); *B63H 25/02* (2013.01); *H04B 1/3822* (2013.01); *H04B 10/80* (2013.01); *B63C 2011/021* (2013.01); *B63H 2025/028* (2013.01)

(58) Field of Classification Search
CPC ....... B63H 23/34; B63H 25/02; H04B 1/3822; H04B 10/80; B63C 11/46; A63B 35/00
USPC .......................................... 114/312, 313, 315
See application file for complete search history.

(56) References Cited

U.S. PATENT DOCUMENTS

| 3,034,467 A | * | 5/1962 | Pestronk ................ A63B 35/12 114/315 |
|---|---|---|---|
| 3,066,638 A | * | 12/1962 | Andresen, Jr. ........ A63B 35/125 440/5 |
| 3,128,739 A | * | 4/1964 | Schultz ................ A63B 35/125 114/315 |

(Continued)

FOREIGN PATENT DOCUMENTS

| DE | 35 13 515 A1 | 10/1986 |
|---|---|---|
| DE | 103 54 314 A1 | 6/2005 |

(Continued)

*Primary Examiner* — Daniel V Venne
(74) *Attorney, Agent, or Firm* — Lewis Roca Rothgerber Christie LLP

(57) ABSTRACT

A support (30) for mechanically coupling a plurality of diver propulsion vehicles (1), each configured for propelling at least one diver, wherein the support (30) is configured for mechanically coupling the plurality of diver propulsion vehicles (1) selectively side-by-side or longitudinally via the support (30), wherein the support (30) is foldable around a joint (31) and convertible between a folded state in which the plurality of diver propulsion vehicles (1) are mechanically coupled side-by-side, and an unfolded state in which the plurality of diver propulsion vehicles (1) are mechanically coupled longitudinally.

6 Claims, 7 Drawing Sheets

(56) References Cited

U.S. PATENT DOCUMENTS

| | | | |
|---|---|---|---|
| 3,131,664 A | 5/1964 | McInvale | |
| 3,323,481 A * | 6/1967 | Harvey | A63B 35/12 114/315 |
| 3,329,118 A * | 7/1967 | Strader | A63B 35/12 114/315 |
| 3,411,474 A * | 11/1968 | Curtis | A63B 35/125 114/315 |
| 3,422,787 A * | 1/1969 | Rush | A63B 35/12 114/315 |
| 3,635,188 A * | 1/1972 | Rutkowski | A63B 35/12 114/315 |
| 3,757,721 A * | 9/1973 | Ohishi | A63B 35/12 114/315 |
| 3,957,007 A * | 5/1976 | Thomas | A63B 35/125 114/315 |
| 3,995,578 A * | 12/1976 | McCullough | A63B 35/12 114/315 |
| 4,220,110 A * | 9/1980 | Roberson, Sr. | A63B 35/125 114/315 |
| 4,467,742 A * | 8/1984 | Duboy | A63B 35/12 114/315 |
| 4,753,187 A * | 6/1988 | Galimand | A63B 35/12 114/315 |
| 4,843,998 A * | 7/1989 | Parker | A63B 35/12 114/315 |
| 4,996,938 A * | 3/1991 | Cameron | A63B 35/12 114/315 |
| 5,024,178 A * | 6/1991 | Bruce | A63B 35/12 114/315 |
| 5,379,714 A * | 1/1995 | Lewis | B63G 8/08 114/315 |
| 5,433,164 A * | 7/1995 | Sneath | B63C 11/46 114/315 |
| 5,509,372 A | 4/1996 | Culotta | |
| 5,984,739 A * | 11/1999 | Donahue | A63B 35/125 114/315 |
| 6,461,204 B1 * | 10/2002 | Takura | A63B 35/12 114/315 |
| 6,823,813 B2 * | 11/2004 | Mazin | B63C 11/46 114/315 |
| 7,124,701 B2 * | 10/2006 | Valente | A63B 35/12 114/315 |
| 7,527,011 B2 | 5/2009 | Smith | |
| 8,249,764 B2 | 8/2012 | Bauer et al. | |
| 9,180,343 B2 * | 11/2015 | Yeo | A63B 35/12 |
| 2004/0185723 A1 | 9/2004 | Grimmeisen | |
| 2006/0081167 A1 * | 4/2006 | Valente | A63B 35/12 114/315 |
| 2010/0212571 A1 * | 8/2010 | White | A63B 35/12 114/315 |
| 2015/0136012 A1 * | 5/2015 | Williams | B63G 8/001 114/312 |
| 2015/0336650 A1 * | 11/2015 | Fenu | B63H 25/02 114/315 |

FOREIGN PATENT DOCUMENTS

| | | |
|---|---|---|
| DE | 10 2005 001 817 A1 | 7/2006 |
| EP | 1 272 389 | 1/2003 |
| EP | 2 088 076 A2 | 8/2009 |
| FR | 2 041 563 | 1/1971 |

* cited by examiner

SUPPORT FOR DIVER PROPULSION VEHICLES

CROSS-REFERENCE TO RELATED APPLICATION(S)

This application claims priority to and benefit of Italian Patent Application Number TO2014A000406, filed on May 21, 2014, the entire disclosure of which is incorporated herein by reference.

The invention relates to a support and to a method of mechanically coupling a plurality of diver propulsion vehicles. The invention further relates to an arrangement comprising a support and a plurality of diver propulsion vehicles mechanically coupled to the support.

Scuba divers have limited operating range. The operation range is mainly limited by the gas supply and by the time the diver can stay within the water. The maximum distance the diver can travel is limited and is linked strongly to the diver's physical endurance.

To enlarge the distance the diver can travel underwater and to increase the travel speed, diver propulsion vehicles (DPV) are used.

Such diver propulsion vehicles can be used for recreational diving, for underwater exploration of caves, for technical diving, etc., where sometimes long distances have to be travelled underwater and in short time.

For some applications it is a requirement, that the diver propulsion vehicle and the divers can be deployed by a submarine. In such cases, the equipment is usually deployed through a hatch. Thus, one central requirement for the design of diver propulsion vehicle equipment is that they can fit into a hatch. If the diver propulsion vehicle is too large to fit into a hatch, the diver propulsion vehicle may be designed in a modular way, where each single module is small enough to fit into the hatch, and once locked out, the modules are assembled.

In diver propulsion vehicle, design is always a tradeoff between distance, speed and maximum drag that can be travelled, and size and weight of the device.

A diver propulsion vehicle usually comprises a pressure resistant watertight casing containing a motor which drives a propeller and a battery. The design shall ensure that the propeller cannot harm the diver, diving equipment or marine life, the vehicle cannot be accidentally started or run away from the diver, and it remains neutrally buoyant while in use underwater.

The most common type of diver propulsion vehicle tows the diver who holds onto handles on the stern or bow. Tow-behind scooters are efficient by placing the diver parallel to and above the propeller wash. The diver wears a harness that includes a crotch-strap with a D-ring on the front of the strap. The scooter is rigged with a tow leash that clips to the scooter with releasable metal snap.

There exist some alternatives to diver tug diver propulsion vehicles: In certain diver propulsion vehicles one or more divers are typically sitting astride them or in hollows inside the diver propulsion vehicle. Alternatives exist, where the thruster is mounted on the tank of a diver. Alternatively there are also embodiments, where the thrusters are mounted on the extremities of a diver, for instance on the upper legs.

Larger diver propulsion vehicles gradually merge into small submarines, often referred to wet subs. A wet sub is a small submarine where the pilots and the passenger seats are flooded and the divers wear diving gear.

U.S. Pat. No. 3,131,664 discloses an underwater sledge. DE 10354314 A1 describes an underwater diver propulsion vehicle, where the thrust is not generated with an electric motor but from a pressured gas supply, and the gas as well as the breathing gas is supplied from the same pressure container. U.S. Pat. No. 5,509,372 discloses the electrical control mechanism of a diver propulsion vehicle, which is used to avoid unsafe fast ascents. EP1,272,389 describes a diver propulsion vehicle with neutral buoyancy and pivotable pylon steering. FR 2 041 563 discloses an underwater vehicle for divers. The divers sit upright upon the vehicle, and thus increase the drag of the vehicle. DE 35 13 515 discloses an underwater craft, where the diver lies on a deck. U.S. Pat. No. 7,527,011 discloses a system, where the thrust is generated not from batteries but from compressed gas from scuba tanks.

Shortcomings in current man tug diver propulsion vehicles are limited reliability, limited thrust and lack of redundancy. Common commercially available diver propulsion vehicles which tow the diver have just one motor and one battery compartment. If one part fails, the diver propulsion vehicle becomes unusable. For this reason, many cave divers for instance, who penetrate long underwater caves and rely on their diver propulsion vehicle, tow an alternative diver propulsion vehicle behind them, so that in the case of a failure, they have a backup diver propulsion vehicle.

Conventional diver propulsion vehicles have only limited thrust. Diver propulsion vehicles are usually designed to tow at maximum two divers at once, but some applications may require that more divers are towed at once.

Furthermore, conventional diver propulsion vehicles have only limited operating range. There is a tradeoff between size of the diver propulsion vehicle and the operating range, as the operation range mainly depends on the battery size.

One could enlarge the size of the diver propulsion vehicle, to be able to tow more divers at once, but this at the cost of larger size, more weight and/or less operating range. If the size of the diver propulsion vehicle is enlarged too much, then it possibly does not fit anymore into a hatch.

It is an object of the invention to provide a support for a plurality of diver propulsion vehicles which overcomes at least part of the above and/or other shortcomings.

The object is solved by the independent claims. Further embodiments are shown by the dependent claims.

According to an exemplary embodiment of the invention, a support for mechanically coupling a plurality of diver propulsion vehicles is provided, each of the diver propulsion vehicles being configured for propelling at least one diver, wherein the support is configured for mechanically coupling the plurality of diver propulsion vehicles selectively side-by-side or longitudinally via the support, wherein the support is foldable around a joint and convertible between a folded state in which the plurality of diver propulsion vehicles are mechanically coupled side-by-side, and an unfolded state in which the plurality of diver propulsion vehicles are mechanically coupled longitudinally.

The support mechanically connects two or more diver propulsion vehicles, which can be mechanically re-arrangeable between at least two structural configurations so as to support two different operation modes: In a first operation mode, the diver propulsion vehicles are arranged laterally or in a parallel arranged state, i.e. with a mutual axis offset, which simplifies operation of two or more diver propulsion vehicles by a single diver controlling all of them (the lateral coupling configuration of multiple diver propulsion vehicles allows all of them to be controlled by a single diver, wherein the communicative coupling between the multiple diver propulsion vehicles allows to synchronize the motors of the multiple diver propulsion vehicles so that the diver can trigger and control all diver propulsion vehicles by one trigger of one of the diver propulsion vehicles; optionally, one or more additional divers may also travel propelled by the diver propulsion vehicles and may, for this purpose, be for instance mechanically connected to the first mentioned diver and/or the diver propulsion vehicles, for instance by a cord or rope). In a second operation mode, the diver propulsion vehicles are coupled longitudinally by the support, i.e. one behind the other and are located along a common axis, so that the coupled diver propulsion vehicles can be guided even through very small openings (such as present in underwater caves, hatches, etc.) in a serially coupled state. Hence, a diver propulsion vehicle system is provided, which is a combination of several diver propulsion vehicles mounted together.

According to still another exemplary embodiment of the invention, an arrangement is provided which comprises a support having the above-mentioned features for mechanically coupling a plurality of diver propulsion vehicles, and the plurality of diver propulsion vehicles (which may for instance be diver propulsion vehicles having the above-mentioned features, in particular having a wireless communication interface), each configured for propelling at least one diver, and mechanically coupled or mechanically coupleable to one another selectively side-by-side or longitudinally via the support.

According to another exemplary embodiment of the invention, method of mechanically coupling a plurality of diver propulsion vehicles is provided, each diver propulsion vehicles being configured for propelling at least one diver, via a support, wherein the method comprises mechanically coupling the plurality of diver propulsion vehicles selectively side-by-side or longitudinally via the support.

In the following, further exemplary embodiments of the support, the methods and the arrangements will be explained.

In an embodiment, the support is configured so as to be foldable around a joint (such as a hinge). Two fastening sections of the support may be folded relatively to one another around the joint, wherein each of the fastening sections may be configured for fastening and accommodating one respective of the diver propulsion vehicles. The support may be configured so as to be in a mechanically stable locking state in both the folded and the unfolded condition.

In an embodiment, the foldable support is convertible between a folded state in which the plurality of diver propulsion vehicles are mechanically coupled side-by-side (when accommodated by the respective support section), and an unfolded state in which the plurality of diver propulsion vehicles are mechanically coupled longitudinally (when accommodated by the respective support section). In the folded side-by-side configuration, the scooters are juxtaposed to one another. In the unfolded longitudinal configuration, the diver propulsion vehicles may be arranged serially so that the assembled arrangement of support and driver propulsion vehicles has a very small cross-section in traveling direction, thereby fitting even through a small accommodation hole. Thus, the support allows, once unfolded, a longitudinal arrangement of two diver propulsion vehicles, so that they fit into a hatch of a submarine.

In an embodiment, the support is convertible between a state in which the plurality of diver propulsion vehicles are mechanically coupled side-by-side and another state in which the plurality of diver propulsion vehicles are mechanically coupled longitudinally by hand operation without tools. Therefore, the conversion between the side-by-side configuration and the longitudinal configuration of the support can be performed manually by a single diver who simply has to pivot two or more support sections of the support around a pivoting axis. The two or more diver propulsion vehicles can be inserted into the support and/or removed out of the support without tools by hand operation, for instance by actuating a clamp mechanism.

In an embodiment, the support comprises at least one mechanical barrier operable to block a wireless communication signal to thereby disable wireless communication via at least one of wireless communication interfaces of the plurality of diver propulsion vehicles when mounted on the support in a certain configuration. Thus, the mechanical barrier may form part of the support. In an embodiment, the mechanical barrier may be located particular at such a position of the support that it blocks wireless communication signals from propagating between the diver propulsion vehicles only in the side-by-side configuration, but not in the longitudinal configuration.

The aspects defined above and further aspects of the invention are apparent from the examples of embodiment to be described hereinafter and are explained with reference to these examples of embodiment.

The invention will be described in more detail hereinafter with reference to examples of embodiment but to which the invention is not limited.

The illustrations in the drawings are schematical. In different drawings, similar or identical elements are provided with the same reference signs.

FIG. 1 shows a longitudinal cross section of diver propulsion vehicle 1 according to an exemplary embodiment of the invention.

Figure 1:
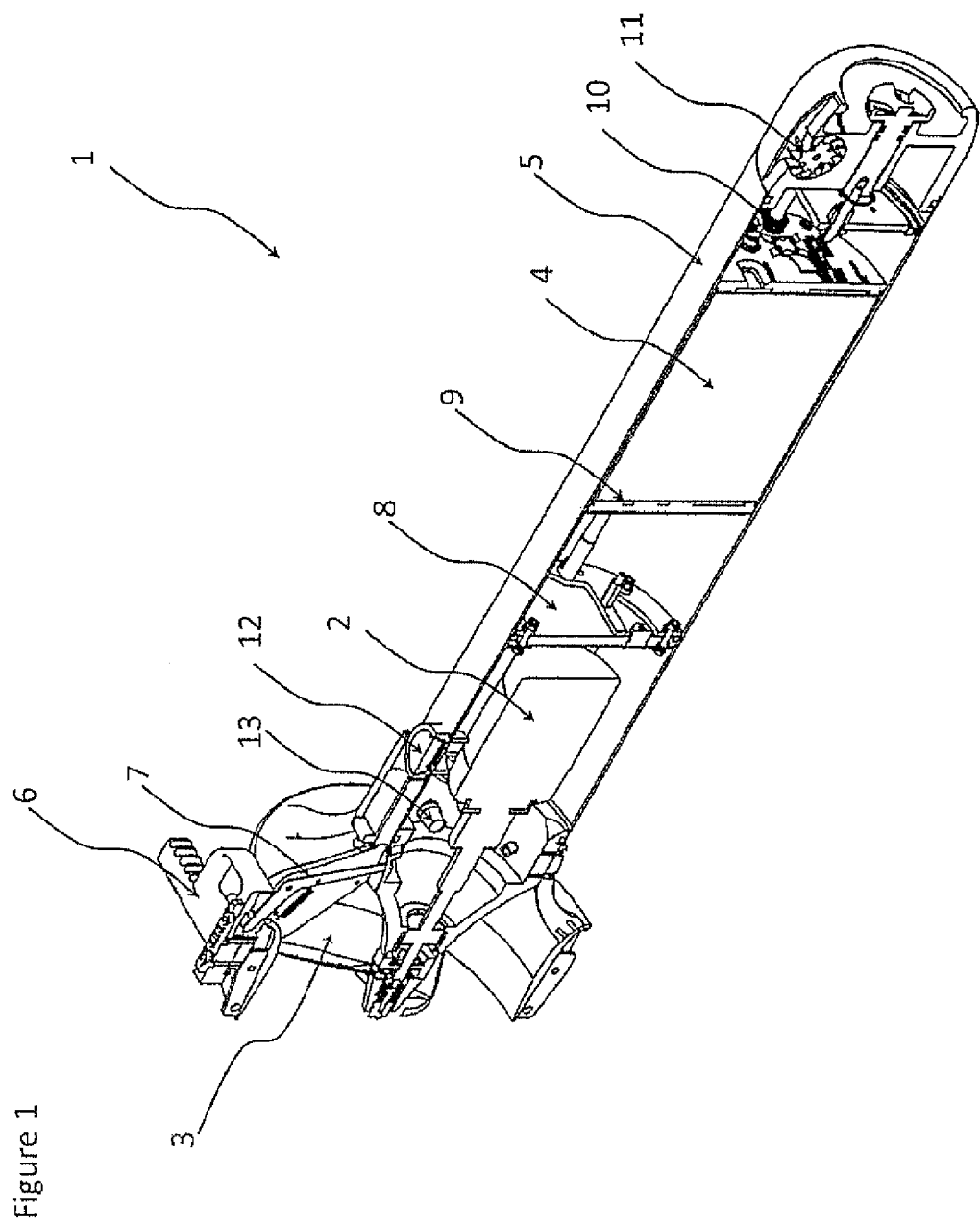
FIG. 1 shows a longitudinal cross-section of a diver propulsion vehicle.

A motor 2 drives a propeller 3 located at the end of the diver propulsion vehicle 1. The battery 4 is located in a front section of the diver propulsion vehicle. Motor 2 as well as battery 4 are located so that the diver propulsion vehicle 1 is balanced in water. A watertight hull 5 houses the motor 2, the battery 4, electronics, etc. Preferably, such a hull 5 is round cylindrically shaped, to withstand higher water pressures. The hull 5 may be fabricated from plastics, metals or fiber and resin laminates, like carbon or glass fiber constructions. A handle 6, to be operated by a user manually, is located on the end of the diver propulsion vehicle 1. A trigger 7 is arranged at the handle 6 of the diver propulsion vehicle 1 and can be actuated by the hand of the user when being placed on the handle 6. A waterproof barrier 8 is located in between the battery 4 and the motor 2, and thereby separates a battery section from a motor section of the diver propulsion vehicle 1. Thus, in the undesired event of a water intrusion, not the complete diver propulsion vehicle 1 will be flooded, but the waterproof barrier 8 will limit water intrusion. The barrier 8 is either completely transparent for infrared (IR) light or is equipped with a window, so that IR light can be transmitted through it when communication within the diver propulsion vehicle 1 (i.e. between different sections thereof) is carried out by infrared communication.

A first IR transmitter 9 is located at the battery 4, which transmits data from the battery management system. This data may include current, remaining charge, remaining runtime and/or battery voltage.

A second IR transmitter 10 is located on a speed measurement unit. The speed measurement unit can be based on different technologies, for instance a simple wheel 11, a propeller or on flow meters. Data from the speed measurement wheel 11 is transmitted to the back of the diver propulsion vehicle 1. Alternatively, there may be a cable line between the speed measurement unit and the battery 4. In this configuration, a combined IR transmitter may send the data both of battery 4 as well as speed measurement unit.

A display 12 is located at a back part of the diver propulsion vehicle 1 close to the motor 2 so as to be properly visible for a diver towed by the diver propulsion vehicle 1. It may comprise an alphanumerical display or may be designed in a simpler way, consisting of only one or more LEDs. One LED may be also an IR diode, forwarding the IR messages outside the diver propulsion vehicle 1 to external components, like for instance a dive computer mounted on the handle 6 of the diver propulsion vehicle 1 or worn on the wrist of the diver.

An IR bridge may be located close to the handle 6. Details concerning the configuration of the IR bridge can be taken from FIG. 8. The IR bridge receives IR signals from inside the diver propulsion vehicle 1 and transmits them outside the hull 5. This IR bridge may comprise or consist of a microcontroller, an IR receiver and an IR transmitting diode. Alternatively, in a simpler from, a mirror and a window may be sufficient, to transmit data outside.

A combined IR transmitter and receiver 13 is located on one side or on both opposing sides of the diver propulsion vehicle 1. It can be used to couple multiple diver propulsion vehicles 1 of the type shown in the figures, for instance to synchronize their speed. If the trigger 7 of one of two or more coupled diver propulsion vehicles 1 is pulled, than this diver propulsion vehicle 1 acts as master, and transmits signals. The other diver propulsion vehicle 1, which is coupled to the master, receives the signals and acts as slave.

Hence, IR transmitters 9, 10 and IR transmitter and receiver 13 of the diver propulsion vehicle 1 function as a wireless communication interface 9, 10, 13 configured for providing a wireless communication within the diver propulsion vehicle 1 and between different diver propulsion vehicles 1 and/or with another communication partner device such as a diver worn head up display, a diver worn dive computer, etc.

Figure 2:
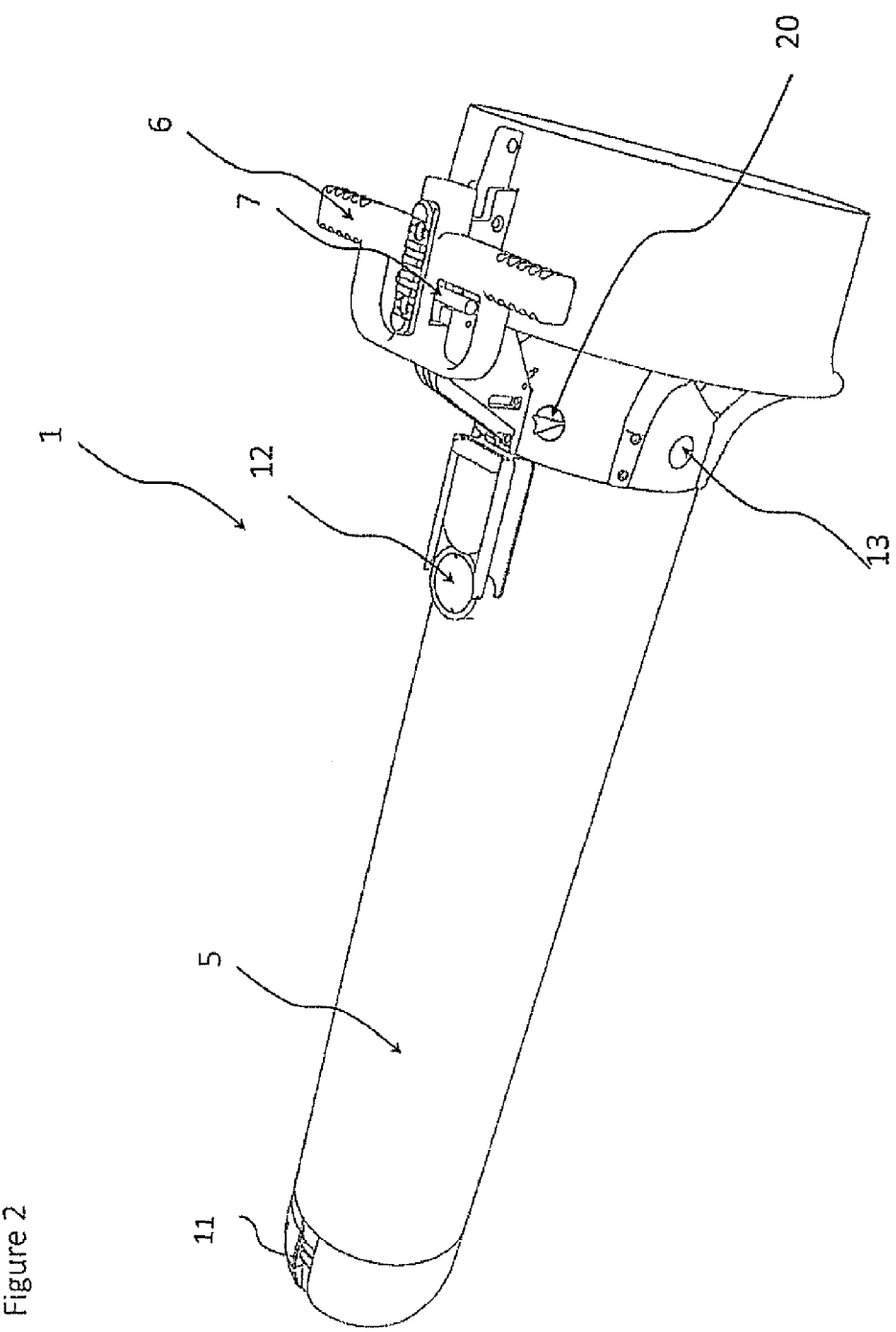
FIG. 2 illustrates a side view of the diver propulsion vehicle of FIG. 1.

FIG. 2 shows aside view of the diver propulsion vehicle 1 according to FIG. 1, and particularly illustrates the handle 6, the display 12, the trigger 7, the hull 5, the combined it receiver and transmitter 13 as well as a power switch 20 to turn offend on the diver propulsion vehicle 1.

Figure 3:
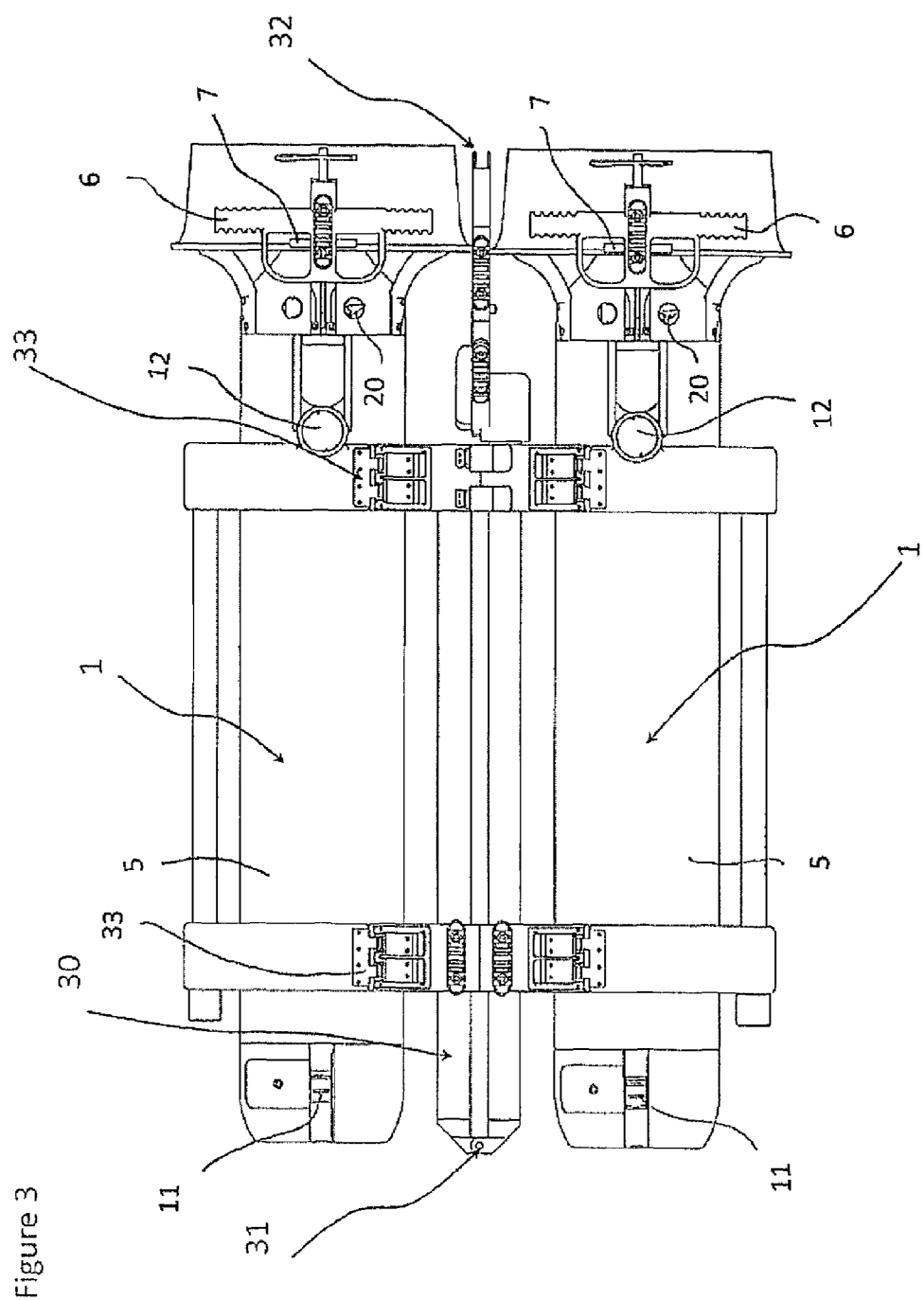
FIG. 3 illustrates an arrangement of two diver propulsion vehicles mechanically connected to one another in a side-by-side configuration via a support according to the invention.

FIG. 3 shows an arrangement according to an exemplary embodiment of the invention formed by two diver propulsion vehicles 1 of the type illustrated in FIG. 1 and FIG. 2 and being mechanically connected to one another by a support 30. In particular, FIG. 3 shows details as to how the two diver propulsion vehicles 1 may be connected to each other with the support 30. To be able to lock out the diver propulsion vehicle 1 from a submarine, the two diver propulsion vehicles 1 can be locked out separately and the divers assemble the diver propulsion vehicle 1 outside the submarine in the water. A mechanical barrier 32 is integrated in the support 30 to mechanically block the infrared transmission between two diver propulsion vehicles 1. The mechanical barrier 32 is positionable so as to mechanically block a wireless communication signal to thereby temporarily block wireless communication via the wireless communication interface 9, 10, 13. The individual diver propulsion vehicles 1 are fixed in the support 30 with clamps 33 or other fastening provisions, that can be hand-operated by a diver without tools. A joint 31 allows folding and unfolding of the support 30 around a folding axis which is perpendicular to the paper plane of FIG. 3.

The support 30 is hence configured for mechanically coupling the diver propulsion vehicles 1 each of which being configured for propelling a respective diver. In the operation mode of the support 30 shown in FIG. 3, the diver propulsion vehicles 1 are mechanically coupled to one another in a side-by-side configuration (which may also be denoted as a lateral configuration) in which the diver propulsion vehicles 1 are arranged or stacked along a direction (extending vertically according to FIG. 3) which is perpendicular to a traveling or motion direction of the diver propulsion vehicles 1 (extending horizontally according to FIG. 3) via the support 30.

While the support 30 serves for mechanically coupling the diver propulsion vehicles 1 to one another, the diver propulsion vehicles 1 are also communicatively coupled to one another. More particularly, the diver propulsion vehicles 1 are configured for wirelessly communicating with one another via their wireless communication interfaces 9, 10, 13 (in particular via their combined transmitters and receivers 13). As will be described below in further detail, the diver propulsion vehicles 1 are configured so that, in an event that the user of one of the diver propulsion vehicles 1 initiates wireless communication via the wireless communication interfaces 9, 10, 13 by actuating the respective trigger 7, the communication initiating diver propulsion vehicle 1 acts as master and the other diver propulsion vehicle 1 acts as slave during the wireless communication. A corresponding communication protocol may be executed by processors of the diver propulsion vehicles 1. When being communicatively coupled, the diver propulsion vehicles 1 are capable to synchronize the motors 2 of the diver propulsion vehicles 1 under control of the present master diver propulsion device 1 for a cooperating propelling of the plurality of diver propulsion vehicles 1 in a mechanically coupled state.

Figure 4:
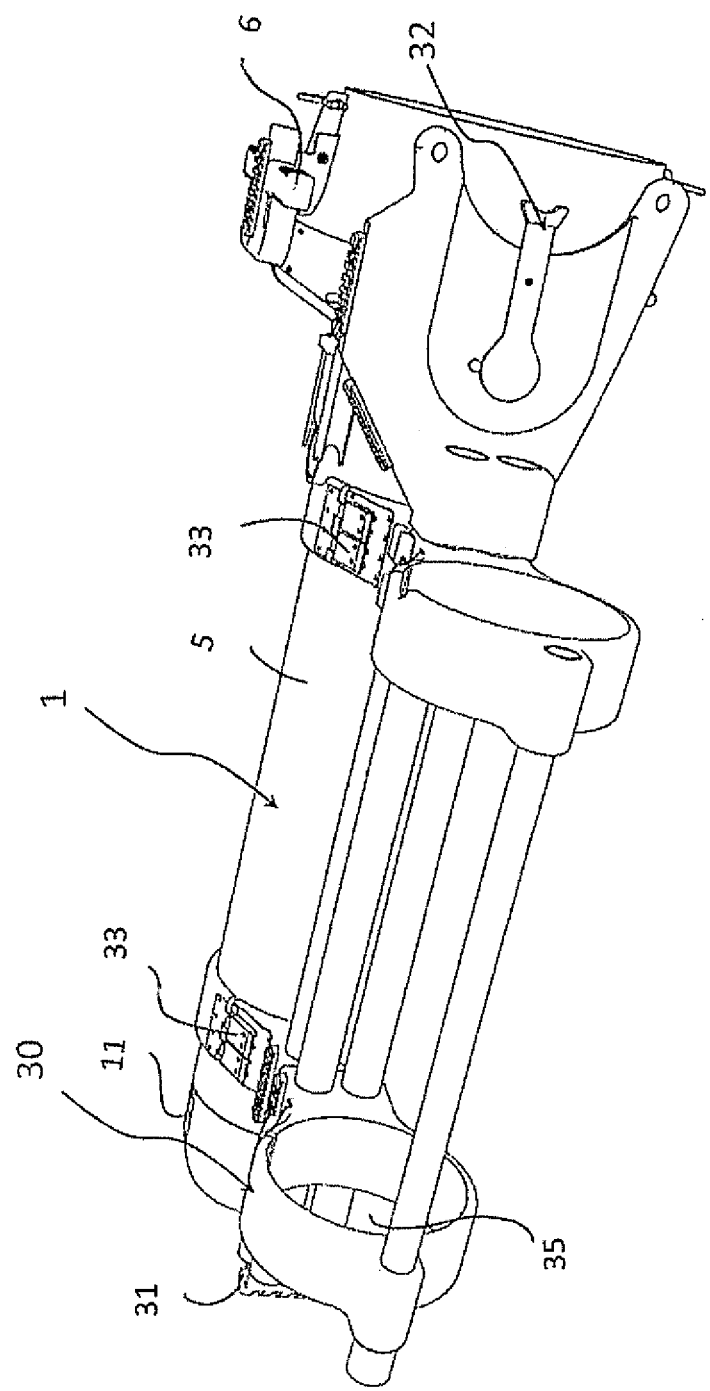
FIG. 4 illustrates the support of FIG. 3 with only one diver propulsion vehicle mounted thereon.

FIG. 4 details the support 30 of FIG. 3 with just one diver propulsion vehicle 1 inserted in a respective vehicle accommodation volume 35 within which the respective diver propulsion vehicle 1 is connectable to the support 30 by clamping. The opaque mechanical barrier 32 is also visible and presently covers the combined IR receiver and transmitter 13 of the shown diver propulsion vehicle 1.

Figure 5:
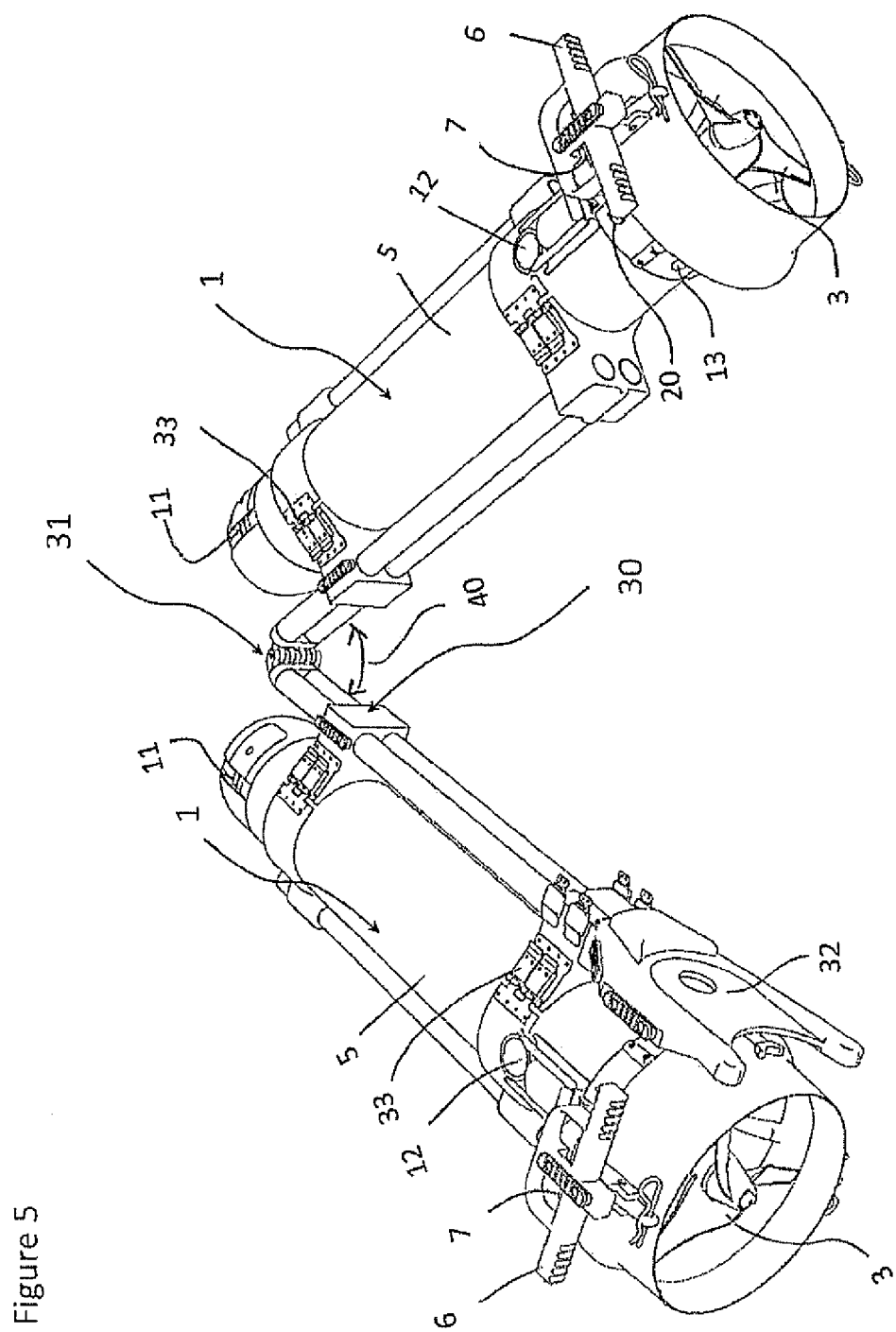
FIG. 5 illustrates the support of FIG. 3 in a partially folded state with two diver propulsion vehicles mounted thereon.

FIG. 5 shows how two diver propulsion vehicles 1 of the type as shown in FIG. 1 can be connected to each other with the foldable support 30 either in a side-by-side configuration (see FIG. 3) or in a longitudinal configuration (see FIG. 6), wherein an intermediate state is shown in FIG. 5). A folding/unfolding motion is indicated schematically in FIG. 5 by reference numeral 40. Joint 31 allows folding the support 30.

Figure 6:
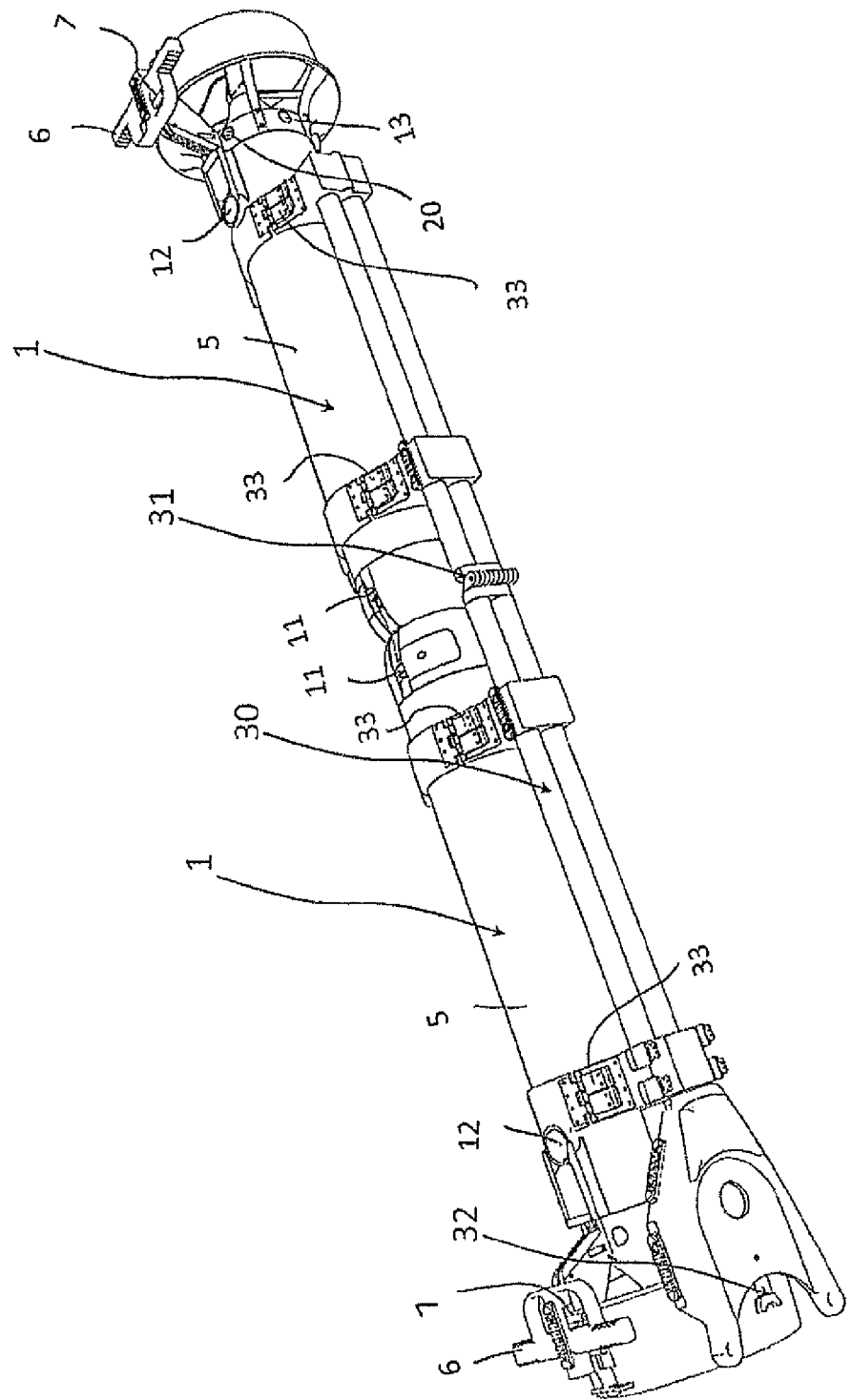
FIG. 6 illustrates an arrangement of two diver propulsion vehicles mechanically connected to one another by the support of FIG. 3 in a longitudinal configuration.

FIG. 6 shows how the two diver propulsion vehicles 1 of FIG. 5 can be connected to each other with the foldable support 30 in a longitudinal configuration, so that they can be pre-configured and mounted together in a submarine due to the compact small dimensioned cross-sectional area. In this longitudinal configuration, the two diver propulsion vehicles 1 still fit into a hatch.

The support 30 is for mechanically coupling the diver propulsion vehicles 1 selectively in a side-by an configuration-side or in a longitudinal configuration via the support 30. The foldable support 30 is convertible between the folded state shown in FIG. 4, via the intermediate state shown in FIG. 5 into the unfolded state of FIG. 6 in which the diver propulsion vehicles 1 are mechanically coupled to one another and located longitudinally, i.e. one behind the other in traveling direction. The support 30 is convertible between these configurations by a simple pivoting motion (the reference numeral 40 in FIG. 5) which can be performed manually by a user, i.e. by hand operation without tools.

Figure 7:
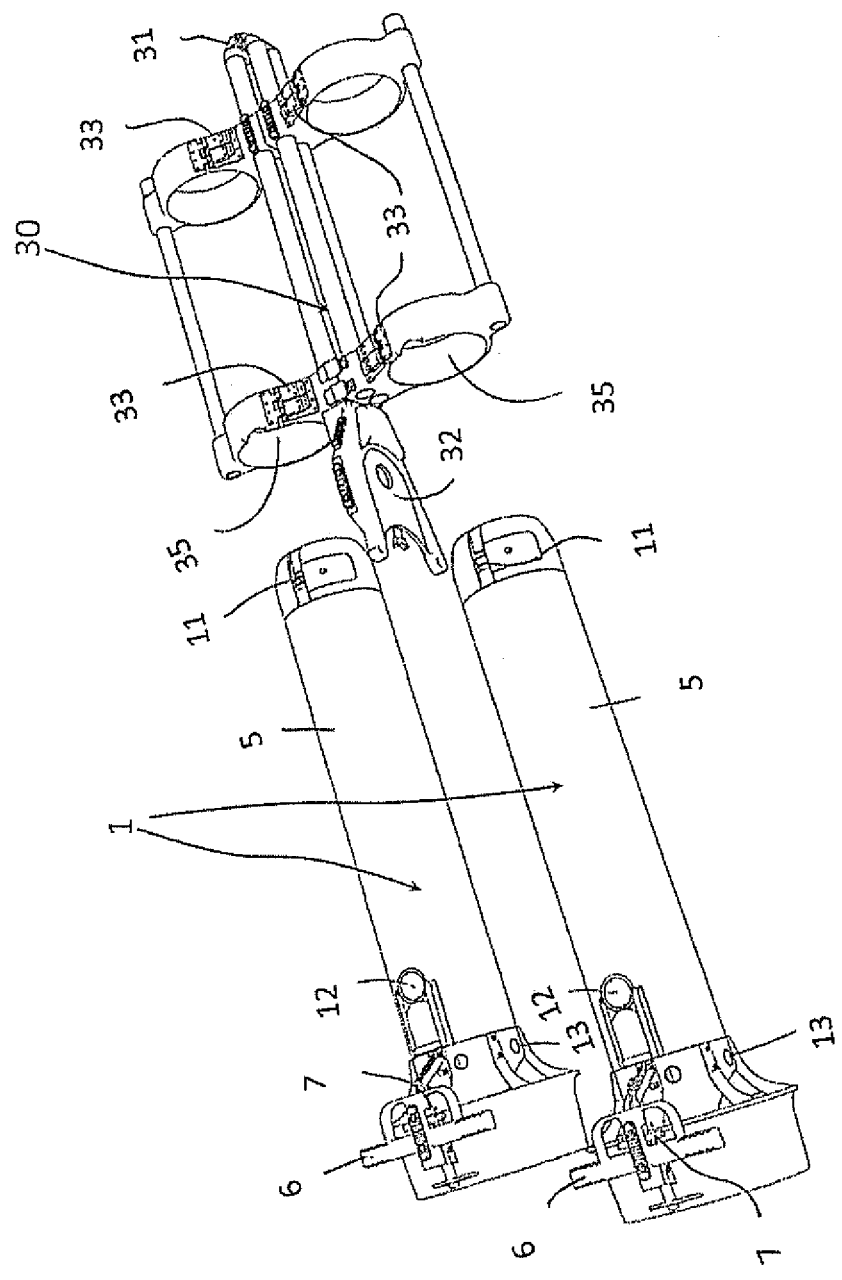
FIG. 7 illustrates two diver propulsion vehicles of FIG. 1 and the support of FIG. 3 not yet mounted to the diver propulsion vehicles.

FIG. 7 shows the support 30 of FIG. 3 and two diver propulsion vehicles 1 of FIG. 1 that are not yet connected, i.e. before the diver propulsion vehicles 1 have been inserted into the respective vehicle accommodation volumes 35.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Implementation of the invention is not limited to the preferred embodiments shown in the figures and described above. Instead, a multiplicity of variants are possible which use the solutions shown and the principle according to the invention even in the case of fundamentally different embodiments.

The invention claimed is:

1. A support for mechanically coupling a plurality of diver propulsion vehicles, each diver propulsion vehicle is configured for propelling at least one diver, wherein the support includes clamps for mechanically coupling the plurality of diver propulsion vehicles selectively side-by-side or longitudinally via the support, wherein the support is foldable around a joint and convertible between a folded state in which the plurality of diver propulsion vehicles are mechanically coupled side-by-side, and an unfolded state in which the plurality of diver propulsion vehicles are mechanically coupled longitudinally.

2. The support according to claim 1, wherein the support is convertible between a state in which the plurality of diver propulsion vehicles are mechanically coupled side-by-side and another state in which the plurality of diver propulsion vehicles are mechanically coupled longitudinally by hand operation without tools.

3. The support according to claim 1, comprising at least one mechanical barrier operable to block a wireless communication signal to thereby disable wireless communication via at least one of wireless communication interfaces of the plurality of diver propulsion vehicles.

4. A method of mechanically coupling a plurality of diver propulsion vehicles, each diver propulsion vehicle is configured for propelling at least one diver, via a support according to claim 1, wherein the method comprises mechanically coupling the plurality of diver propulsion vehicles selectively side-by-side or longitudinally via the support.

5. The method according to claim 4, comprising the step of converting the support between one state in which the plurality of diver propulsion vehicles are mechanically coupled side-by-side and another state in which the plurality of diver propulsion vehicles are mechanically coupled longitudinally.

6. The method according to claim 5, wherein the method is operated by hand operation, without tools.

* * * * *